April 16, 1935.　　W. LAUDENBACH ET AL　　1,997,692
RECORDING APPARATUS
Filed June 16, 1930
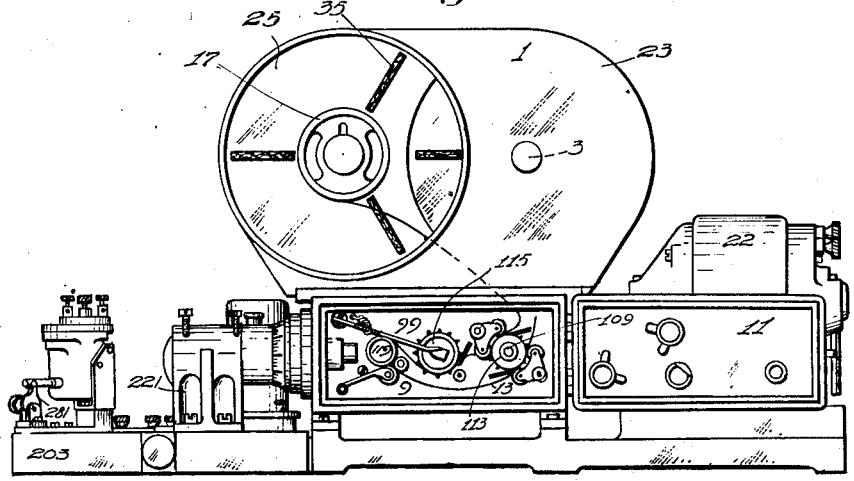
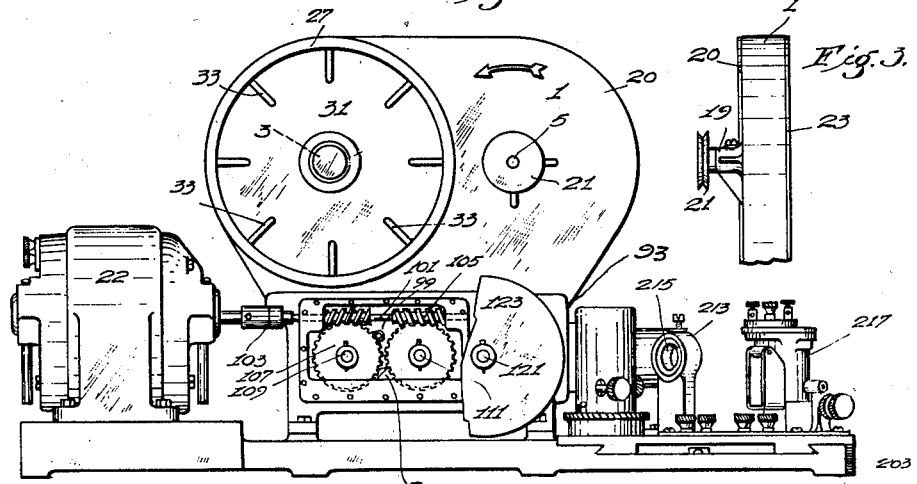
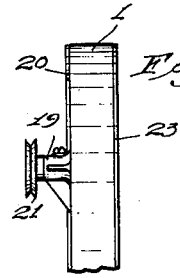
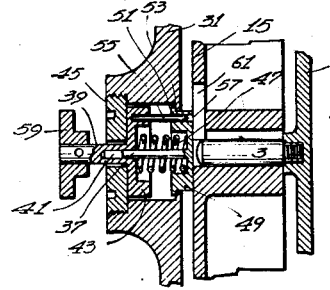
INVENTORS
William Laudenbach and
Francis E. Herndon.
BY
Wesley G. Carr
ATTORNEY Patented Apr. 16, 1935

1,997,692

UNITED STATES PATENT OFFICE 1,997,692

RECORDING APPARATUS

William Laudenbach, Mexico, D. F., Mexico, and Francis E. Herndon, Collingswood, N. J., assignors to Westinghouse Electric and Manufacturing Company, a corporation of Pennsylvania Application June 16, 1930, Serial No. 461,274

2 Claims. (Cl. 242—71)

Our invention relates to improvements in photo-acoustic apparatus and has particular relation to recording equipments.

It is an object of our invention to provide a small and compact film magazine for a recorder.

According to our invention, we provide, for a photo-acoustic recorder, a magazine wherein the spindles are separated by a distance less than the maximum diameter of a complete film roll disposed therein.

The novel features that we consider characteristic of our invention are set forth with particularity in the appended claims. The invention itself, however, both as to its organization and its method of operation, together with additional objects and advantages thereof, will best be understood from the following description of a specific embodiment, when read in connection with accompanying drawing, in which:

Figure 1 is a view, in elevation, of a photo-acoustic recorder constructed according to our invention, showing the film-advancing mechanisms, Fig. 2 is a view, in elevation, of the apparatus, the rear cover being removed to show the power-transmission elements, Fig. 3 is a view, in end elevation, of a film magazine constructed according to our invention, Fig. 4 is a view, in section, of a film hub and of a film-tensioning device used therewith.

The apparatus shown in Figs. 1 and 2 comprises, essentially, a magazine 1 equipped with feeding and take-up spindles 3 and 5, a gear chamber 7, and a chamber 9, provided with a door 11, wherein a film 13 is advanced and exposed to the sound-modulated light projected and modified by a plurality of optical elements.

The virgin film 13 is fed from a hub 15 that is centrally positioned on the feeding spindle 3 and rotatable relative thereto. After being exposed, the film is wound on a hub 17, keyed near one end of the take-up spindle 5, and rotatable therewith. The take-up spindle 5 is rotatably supported on a bearing 19, cast integral with the wall 20 of the magazine 1, and has, centrally mounted on its remaining end, a pulley 21, whereby it is rotated from the prime mover 22 of the apparatus through a belt (not shown).

The spindles 3 and 5 (Figs. 1 and 2) are not separated by a distance equivalent to the diameter of the virgin film-roll, in accordance with the practice taught by the prior art, but are separated by a distance slightly greater than the maximum radius of the film roll. Full advantage is thus taken of the space available in the magazine.

Furthermore, by reason of the fact that it is undesirable that the manufacture of the magazine shall be encumbered by the necessity of producing a carefully machined oval-shape opening, the spindles are positioned on opposite walls 20 and 23 of the magazine, and circular openings 25 and 27 are milled opposite the spindles. Circular plates 29 and 31, threaded to engage the threads cut in the boundaries of the openings, are provided for preventing the intrusion of light into the magazine, when the machine is operating, and bosses 33 are provided on the surface of the plates 29 and 31 for facilitating their positioning on the magazine and their removal therefrom.

Finally, a plurality of grooved bosses 35 are cast integral with the walls of the magazine, wherein a material, such as felt, is disposed to co-act with the virgin film roll to prevent it from unwinding under its own inertia.

To further prevent the film from choatically accumulating in the magazine, we provide, in the cover 31, opposite the feeding spindle a device for manually tensioning the film. The device comprises a pin 37 (Fig. 4) having a bushing 39 co-axially fastened thereto and provided with a stem 41 and a flange 43 of C-section. The bushing 39 is slidably supported near one surface of the magazine cover 31. It is urged into engagement with a washer 45, screwed into the surface of the cover, by a compression spring 47 that coacts with a shouldered cup-shape bushing 49, slidably supported near the remaining surface of the cover and prevented from being projected therefrom by the engagement of the shoulder 51 and the flange 53 in the cover 31. A pin 55 is fastened to the flange 43 of the bushing 39 and projects into a clearance hole 57 provided for it in the cup-shape bushing 49.

The flange bushing 39 is axially displaced and rotated by a knob 59 pinned to its stem 41, and the pin 55, disposed therein is thus projected through the cup-shape bushing 49 to engage a slot 61, milled radially in the feeding hub 15. The hub 15 may now be rotated from the knob 59 in a direction opposite to its normal direction of rotation, thus tensioning the film strip 13 that is being unwound therefrom.

Film-advancing mechanisms are disposed on one side of a vertical plate 99 (Figs. 1 and 2) that is centrally located between the exposure chamber 9 and the gear chamber 7 and is cast integral therewith, while power-transmission mechanisms for the film-advancing mechanisms are located on the opposite side of the plate. Power is transmitted to drive the film 13 through a shaft 101, supported on bearings disposed in the ends of the chamber 7. The shaft is rotated from the motor 22 through a metallic coupling 103. Coaxially mounted on the shaft and rotatable therewith, are a plurality of worms 105 that coact with worm wheels 107 to drive the shafts 109 and 111 through which a plurality of film-advancing sprockets 113 and 115 (in the chamber) are rotated.

The film 13 is drawn from the feeding spindle and is delivered to the take-up spindle by one sprocket 113, while a second sprocket 115, rotated from its shaft through a flexible coupling (not shown), advances the film over a roller 119 and rotates the roller.

The roller 119 is pinned to one end of the shaft 121 that is rotatably mounted in a bearing projecting from the vertical supporting plate 99 of the moving mechanisms, and a flywheel 123 is centrally supported on the remaining end of the shaft to rotate therewith. The flexibly driven sprocket 115 and the flywheel 123 cooperate to maintain the film in uniform motion.

The elements of recording the optical system are mounted on a platform 203 disposed adjacent to the chamber 8.

The optical system comprises a lamp (not shown), a lens 213, masked by an aperture 215, a galvanometer 217, wherein a mirror (not shown) is suspended, by two metallic ribbons, between the poles of the magnet and a plurality of lenses and a slit mounted in a cylindrical opening (not shown) in a bracket 221 supported on the platform 203. The parts of the galvanometer do not concern the present invention and are consequently, not shown in detail.

In the practice of our invention, light from the source is projected on the galvanometer mirror and after being reflected therefrom, is transmitted through the lense system mounted in the bracket 221 and focussed on the film 13. The galvanometer mirror is pivoted in accordance with the sound to be recorded and the light beam reflected from the mirror is deflected in accordance with the movement of the mirror. As the film 13 is advanced, it is subjected to the influence of the light and a record is impressed thereon.

Although we have shown and described a certain specific embodiment of our invention, we are fully aware that many modifications thereof are possible. Our invention, therefore, is not to be restricted except insofar as is necessitated by the prior art and by the spirit of the appended claims.

We claim as our invention:

1. A film magazine comprising an enclosure, and a plurality of spindles mounted within said enclosure, the distance between said spindles being less than the diameter of a film roll to be supported on one of said spindles, a plurality of openings in said enclosure, said openings being disposed in opposite walls of said enclosure and means for closing said openings.

2. A film magazine comprising an enclosure, having openings in opposite walls thereof, a plurality of spindles mounted within said enclosure and a plurality of hubs to support a film roll mounted on said spindles, said magazine being of the type wherein the film roll is coaxially supported on the hub mounted on one spindle and is unwound therefrom onto the hub mounted on another spindle; characterized by that said spindles are so disposed in said enclosure that the minimum distance between the peripheries of said hubs is substantially equivalent to the difference between the outer radius of the largest film roll that is to be utilized in said magazine and the radius of one of said hubs.

W. LAUDENBACH.
FRANCIS E. HERNDON